United States Patent
Payne et al.

(10) Patent No.: US 8,494,884 B2
(45) Date of Patent: *Jul. 23, 2013

(54) SYSTEM AND METHODS FOR SELECTING EVENT TICKETS

(75) Inventors: Andrew C. Payne, Lincoln, MA (US); Michael Janes, San Jose, CA (US); Mark Towfiq, Palo Alto, CA (US); Rishi Garg, San Francisco, CA (US); Lisa Pollock Mann, San Francisco, CA (US); Afshin Shafie, Los Gatos, CA (US); Trung Dung Chi Pham, Milpitas, CA (US); Zach Saltzberg, Fairfax, CA (US); Maureen Kelly, Redwood City, CA (US)

(73) Assignee: Nextag, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/070,824

(22) Filed: Mar. 24, 2011

(65) Prior Publication Data

US 2011/0173032 A1 Jul. 14, 2011

Related U.S. Application Data

(60) Division of application No. 12/234,357, filed on Sep. 19, 2008, now Pat. No. 8,090,603, which is a continuation-in-part of application No. 12/118,391, filed on May 9, 2008, now abandoned.

(60) Provisional application No. 60/928,667, filed on May 11, 2007.

(51) Int. Cl.
*G06Q 10/00* (2012.01)

(52) U.S. Cl.
USPC .................................. 705/5; 705/6

(58) Field of Classification Search
USPC ............................................. 705/14
See application file for complete search history.

(56) References Cited

U.S. PATENT DOCUMENTS

| | | | | |
|---|---|---|---|---|
| 5,844,572 | A * | 12/1998 | Schott | 345/440 |
| 5,911,138 | A * | 6/1999 | Li et al. | 1/1 |
| 6,307,572 | B1 | 10/2001 | Demarcken et al. | 715/763 |
| 7,349,894 | B2 | 3/2008 | Barth et al. | 1/1 |
| 7,917,398 | B2 | 3/2011 | Gibson et al. | 705/26.8 |
| 2002/0082879 | A1 | 6/2002 | Miller | 705/5 |
| 2002/0103849 | A1* | 8/2002 | Smith | 709/201 |
| 2003/0071814 | A1* | 4/2003 | Jou et al. | 345/440 |
| 2005/0187858 | A1* | 8/2005 | Graham et al. | 705/37 |
| 2005/0262065 | A1* | 11/2005 | Barth et al. | 707/3 |
| 2007/0105612 | A1* | 5/2007 | Fotevski | 463/16 |

(Continued)

FOREIGN PATENT DOCUMENTS

| | | |
|---|---|---|
| CA | 2486260 | 10/2004 |
| WO | WO/2007/112425 | 10/2007 |

*Primary Examiner* — Tonya Joseph
(74) *Attorney, Agent, or Firm* — Haverstock & Owens

(57) ABSTRACT

A system is provided that enables customers to search for event tickets for purchase. A computer interacts with the user to allow the user to specify criteria for event tickets the user wishes to purchase. The system presents relevant event ticket results, and provides filters for the user to further refine those search results. The user selects an event, and then selects tickets for that event. Ticket availability is shown, with seat locations indicated directly on an interactive venue map. For purchase, the user is directed to the selling ticket provider.

49 Claims, 13 Drawing Sheets

U.S. PATENT DOCUMENTS

| | | | |
|---|---|---|---|
| 2007/0265892 A1* | 11/2007 | Valentino | 705/5 |
| 2008/0005017 A1* | 1/2008 | Poster | 705/39 |
| 2008/0109758 A1 | 5/2008 | Stambaugh | 715/835 |
| 2008/0140532 A1* | 6/2008 | Johnson et al. | 705/14 |

* cited by examiner

FIG. 4

FIG. 6B 11197 of 11197 tickets (3577 of 3577 offers)

▼ ☆ Short List - 1 Offer — 660

| Sun, Sep 28 $86ea select | section: Standing Room row: ships today $86 + $0 from StubHub Notes: 3rd BasePavilion Gen.Adm  ☒ |

— 661

▼ Matching Results - 3577 Offers sort by: [ Price - Low to High ⇅ ]

| Sat, Sep 27 $65ea select | section: N/A row: N/A \| 4 Tickets Available $65 + $0 handling from StubHub ☆ |

| Fri, Sep 26 $80ea select | section: N/A row: N/A \| 2 Tickets Available $80 + $0 handling from StubHub Notes: Last Series Against New York Yankees ☆ |

| Sun, Sep 28 $86ea select | section: Standing Room row: ships today \| 4 Tickets Available $86 + $0 handling from StubHub Notes: 3rd BasePavillion Gen.Adm ☆ |

— 663
— 662

| Sun, Sep 28 $87ea select | section: Standing Room row: SRO \| 4 Tickets Available $87 + $0 handling from StubHub Notes: Hard paper tickets, SRO on the 1st base side. In hand and ready to ship immediately. ☆ |

| Fri, Sep 26 $95ea select | section: Standing Room row: 1 \| 2 Tickets Available $95 + $0 handling from StubHub ☆ |

Terms of Use lay 542-0595 Superstore | Online Tickets USA 100% Guaranteed- Fast-Safe-Secure No Service Fee Call 800-766-6464 | Buy/Sell Tickets-Free Local buyers and sellers - Online Avoid the hassle & cost of shipping

FIG. 6C

SYSTEM AND METHODS FOR SELECTING EVENT TICKETS

CROSS-REFERENCE TO RELATED APPLICATIONS

This application is a divisional of U.S. Ser. No. 12/234,357 filed Sep. 19, 2008 which is a continuation-in-part of U.S. Ser. No. 12/118,391, filed May 9, 2008, which claims the benefit of U.S. Ser. No. 60/928,667, filed May 11, 2007, all of which applications are fully incorporated herein by reference.

BACKGROUND OF THE INVENTION

1. Field of the Invention

This invention pertains in general to product search, and in particular to methods for searching, filtering and selecting event tickets for purchase.

2. Description of the Related Art

Many ticket-related Web sites enable users to purchase event tickets on-line. These Web sites allow users to browse or search a list of events, to choose an event (e.g. "Kenny Chesney, at the TD Garden at 7 pm on May 28"), to choose their specific seats within the venue for the selected event, and then to submit their order to purchase.

These Web sites provide some convenience for purchasing tickets, but place much of the burden of finding relevant tickets on the user. For example, a user may choose a specific event just to find that the event is sold out, or may find that the cheapest tickets available for an event are beyond the user's budget. Or, a user may want to sit in a particular section of the venue, and is forced to research each event individually to find if any tickets are available in that section. Or, a user may wish to go see a "Red Sox home game on an upcoming weekend, for less than $150 per ticket". Existing Web sites force the user to manually research each and every weekend Red Sox game at Fenway Park to see if there are any tickets for less than $150.

SUMMARY OF THE INVENTION

Accordingly, an object of the present invention is to provide an improved event ticket search system, and its associated methods of use, that enables a user to purchase a ticket that matches the user's search criteria.

Another object of the present invention is to provide an event ticket search system for a user to purchase tickets, and its associated methods of use, that enables the user to use search criteria to find an event.

A further object of the present invention is to provide an event ticket search system for a user to purchase tickets, and its associated methods of use, that enables the user to use search criteria to find an event and then filter the searched results.

A further object of the present invention is to provide an event ticket search system for a user to purchase tickets, and its associated methods of use, that enables the user to use search criteria to find an event, filter the searched results, chose the event and then find tickets for the event.

These and other objects of the present invention are achieved in, an event ticket search system that includes, a network, a user's Web browser coupled to the network and a database of ticketed events coupled to the network. An event search server is coupled to the Web browser and the database. The Web browser is configured to provide one or more search results of ticketed events to an user that submits a request with ticket search criteria to the event search. One or more filters are coupled to the event search server. The one or more filters provide filtering of search results in response to the ticket search criteria. A display is coupled to the one or more filters.

In another embodiment of the present invention, a method is provided for executing instructions from an event ticket search system. An event ticket search system is provided that includes a network. A user's Web browser is used to provide one or more search results of ticketed events to an user that submits a request with ticket search criteria to an event search server. One or more filters are coupled to the event search server. Filtered search results are produced in response to the ticket search criteria. These filtered search results are used to purchase tickets.

BRIEF DESCRIPTION OF THE DRAWINGS

FIG. 4 is an example of the event result user interface page for the event ticket search system.

FIG. 6b is an example of the seat selection page shown in FIG. 6, with the venue map zoomed in.

FIG. 6c is an example of a section of the seat selection in FIG. 6, with items added to the user's short list.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

In one embodiment, the present invention provide systems and methods for capturing a user's specific or general criteria for the tickets they wish to purchase, and for presenting significant results to the user that match those criteria. Furthermore, the system provides methods for the user to easily and efficiently refine search results to quickly identify tickets to purchase. The system generally interacts with the user in three steps. The first step, event selection, is where the user chooses which event (e.g. "Boston Red Sox v New York Yankees, at 7:05 pm on May 28") or events she wants to consider, based on her criteria. The second step, seat selection, is where the user chooses specific seats for an event. In the third step, the user then purchases the tickets from the selling ticket provider.

Figure 1:
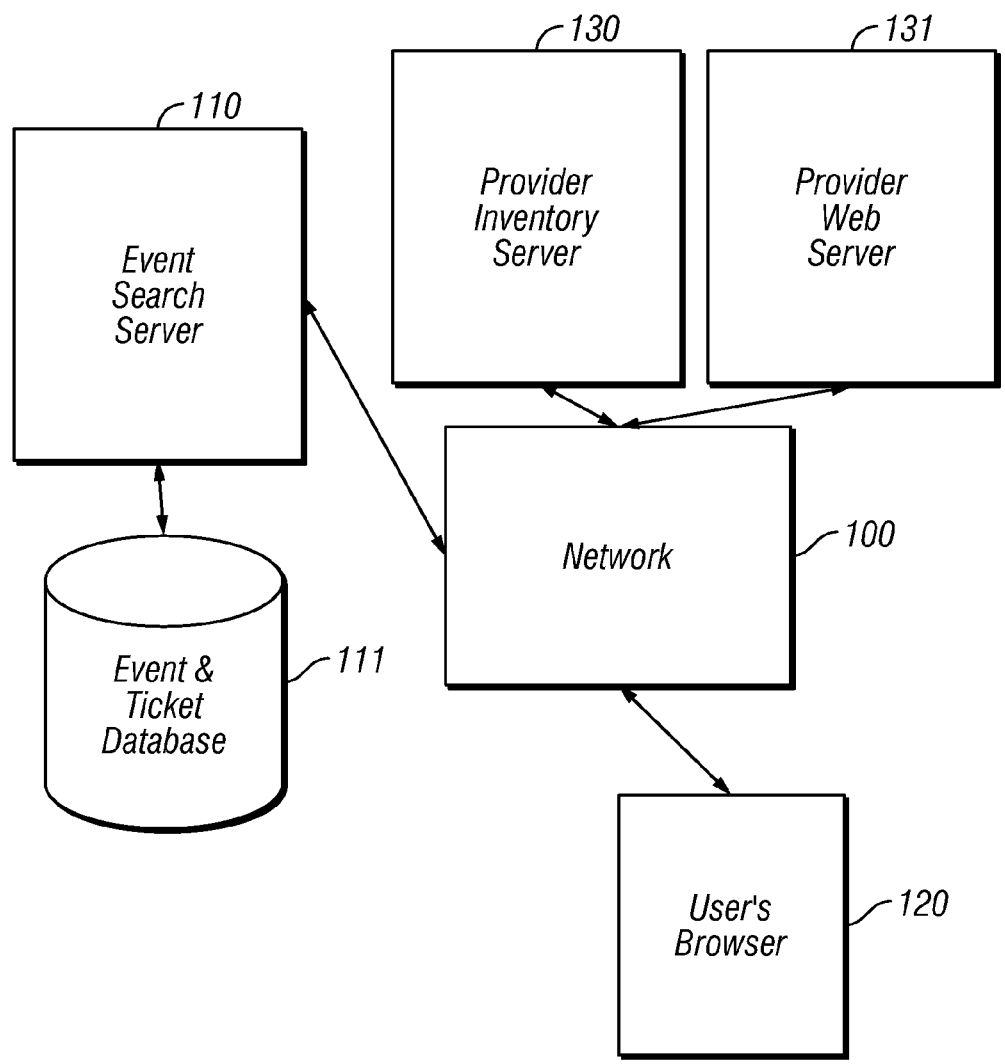
FIG. 1 is a high-level block diagram of the environment and software architecture for the event ticket search engine.

FIG. 1 is a high-level block diagram illustrating an event ticket search system environment. As used herein, the individual systems in FIG. 1 will be referred to as single systems, but it should be understood that a plurality of the same type of systems could be connected to the network 100.

The user's Web browser 120 represents an entity that submits event ticket search criteria to event search server 110 and receives event and ticket results information from server 110 for display to the user. Usually, the user requests event and ticket information for the purposes of purchasing tickets; for this reason, the user is sometimes referred to as a "purchaser" or "buyer".

In one embodiment, the user uses a computer system 120 to communicate with event search server 110 and other systems on a network 100 in order to obtain event and ticket information. The computer system, for example, can be a personal computer executing a Web browser such as APPLE SAFARI that allows the user to retrieve and display content from Web servers and other computer systems on network 100. In other embodiments, the user uses a network-capable device other than a computer system, such as a personal digital assistant (PDA), a cellular telephone, a pager, a television "set-top-box", a MP3 player, etc. The user's computer system may also be referred to as a "client" of event search server 110.

The network 100 represents the communication pathways between the user's Web browser 120, event search server 110, provider inventory server 130, and provider Web server 131. In one embodiment, the network 100 is the Internet. The network 100 can also utilize dedicated or private communications links that are not necessarily part of the Internet. In one embodiment, the network 100 uses standard internet-working communications technologies and/or protocols. Thus, the network 100 can include links using technologies such as Ethernet, 802.11, integrated services digital network (ISDN), digital subscriber line (DSL), asynchronous transfer mode (ATM), etc. Similarly, the networking protocols used on the network 100 can include Transmission Control Protocol/Internet Protocol (TCP/IP), the Hypertext Transfer Protocol (HTTP), the Simple Mail Transfer Protocol (SMTP), the File Transfer Protocol (FTP), etc. The data exchanged over the network 100 can be represented using the technologies and/or formats including the Hypertext Markup Language (HTML), the Extensible Markup Language (XML), etc. In addition, all or some of the links can be encrypted using conventional encryption technologies, such as Secure Sockets Layer (SSL), Secure HTTP, and/or virtual private networks (VPNs). In another embodiment, the entities can use custom and/or dedicated data communications technologies, instead of, or in addition to, the ones described above.

The database 111 contains information about the tickets that are available for purchase and the events to which those tickets relate. For example, the database may include ticket information including: price, row, section, and the name of the selling ticket provider. The associated event information may include: venue name, city & state, the artist or team(s) performing, the type of event (e.g. "baseball game"), and the starting date and time. Database 111 may be stored in any mechanism that represents structured records of data (e.g. a SQL database, a flat file with records, an object-oriented database, etc.)

The ticket provider inventory server 130 provides access to current ticket inventory information (e.g. price and quantity) for the selling ticket provider. Note that there may be a plurality of servers, with different servers for each selling provider.

The ticket provider Web server 131 provides the checkout process for the user to purchase selected tickets from the selling ticket provider. Note that there may be a plurality of servers, with different servers for each selling provider. Also, provider Web server 131 may be the same server as inventory server 130, for a given ticket provider.

It should be understood that other information sources or systems could be connected to network 100. For example, the information systems operated by the selling ticket providers (for example, provider inventory server 130) may be connected to network 100. As another example, other Web sites accessed by user's browser 120 may be connected to network 100.

Description of Starting Page

Figure 2A:
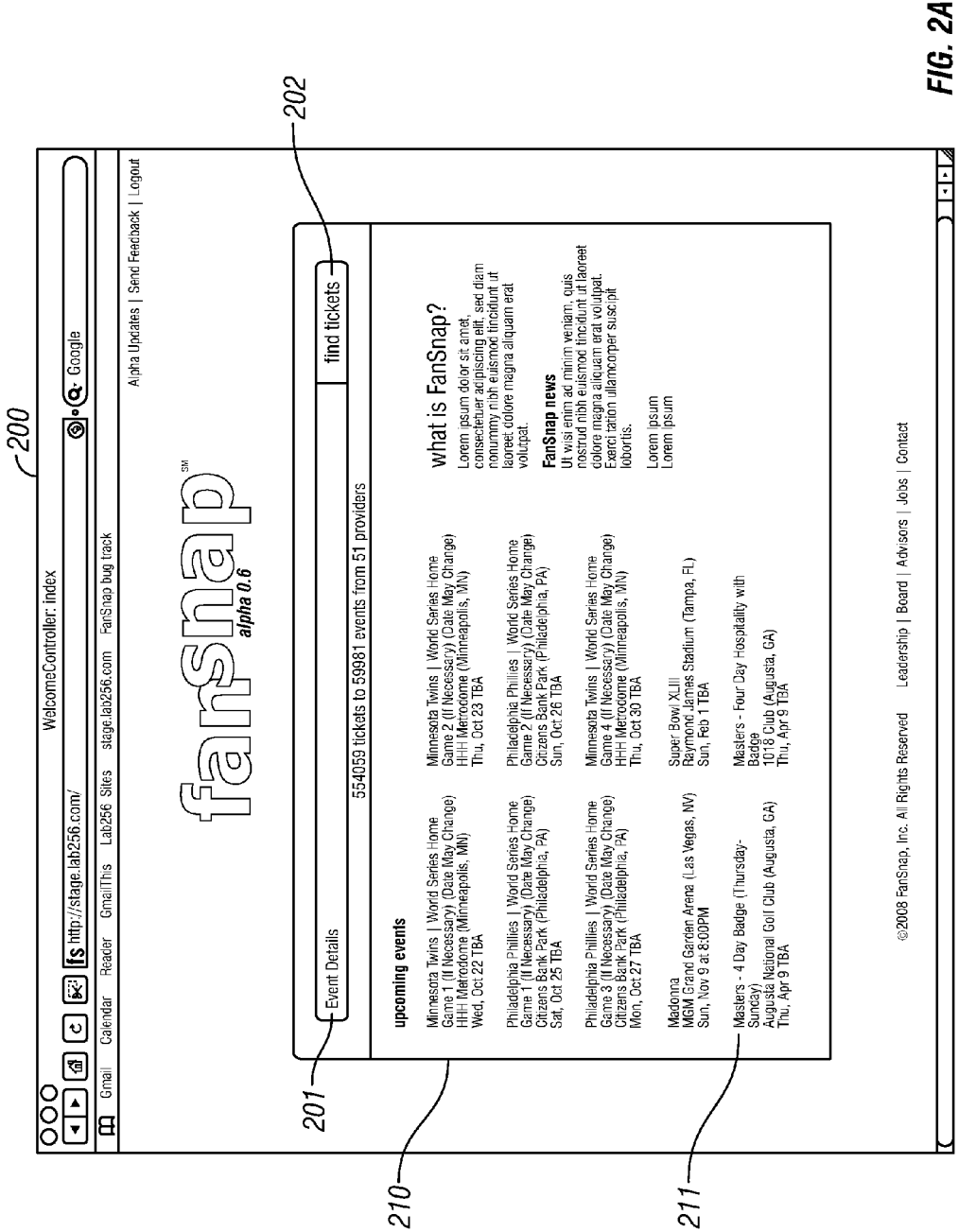
FIG. 2a is an example of the initial (starting) user interface page for the event ticket search system.
Figure 4:
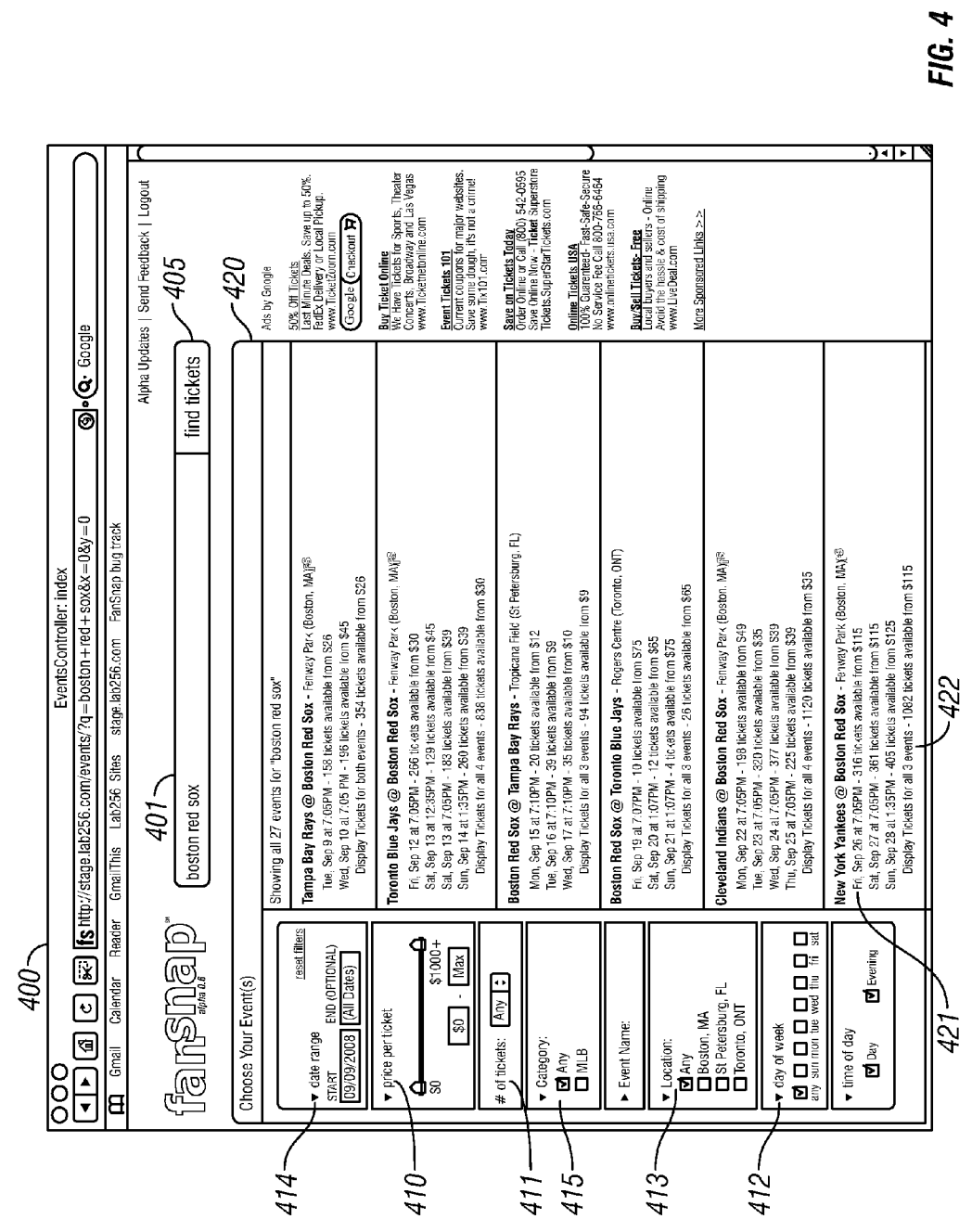
Figure 6:
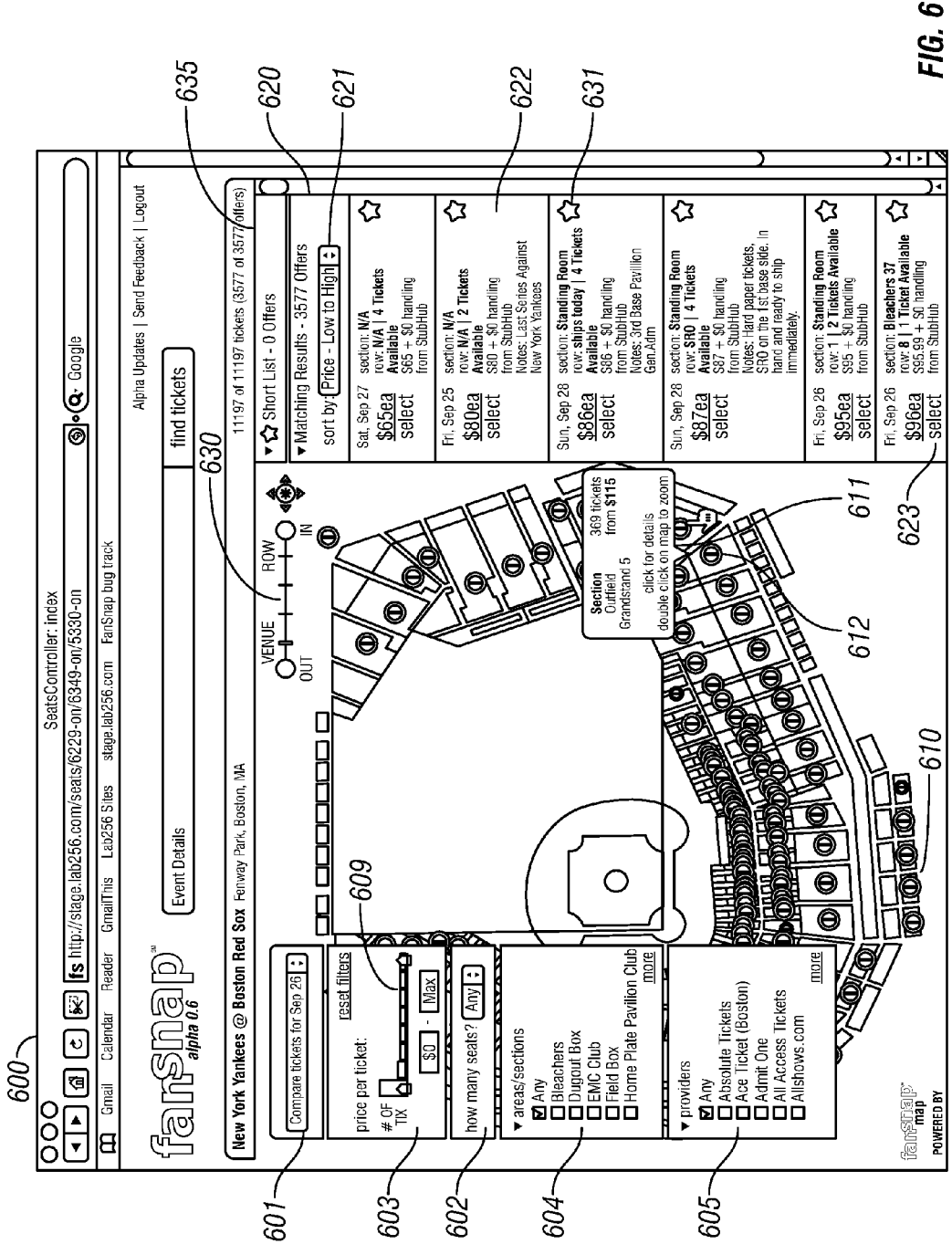
FIG. 6 is an example of the seat selection user interface page for the event ticket search system.

FIGS. 2*a*, 4, and 6 are examples of the user's interaction sequence. In this example, beginning in FIG. 2*a* at Web page 200, the user enters the search criteria in input box 201 for the desired event tickets. The search criteria may include an event name, artist name, team name, opposing team name, venue name, venue location, venue section/area, price range, location, date, month, day of week, event type, game type, genre, any portion thereof, or any other text describing the type of event(s) the user wishes to see tickets for (e.g. "Boston Red Sox" or "Kenny Chesney" or "Kenny Chesney Charleston W. Va." or "Red Sox home opener" or "Red Sox v Yankees" or "Red Sox home opener" or "Wicked in Chicago front row under $500"). If nothing is entered in box 201, the system will assume the user wishes to see all events.

Once the search criteria have been entered, the user presses search button 202 to initiate a search for events that match the criteria specified. The user's criteria are transmitted from user browser 120 to server 110.

Web page 200 may also display a list 210 of upcoming events. Upcoming event list 210 may display the most popular events available in the system, events near the user's physical location, events specifically selected by the operators of the event search system, events randomly selected, or any combination of these. The user's physical location (or estimate of her physical location) may be determined by any number of methods known to those skilled in the art (e.g. IP address geo-location, or explicitly specified by the user at some point in the interaction, or remembered from some previous interaction).

The upcoming event list 210 includes a list of individual events (e.g. event 211). If the user selects an event from this summary (e.g. by clicking on link corresponding to event 211), the user is taken directly to Web page 600 (see FIG. 6) to select seats for the selected event.

Description of Start Page (Alternative Embodiment)

Figure 2B:
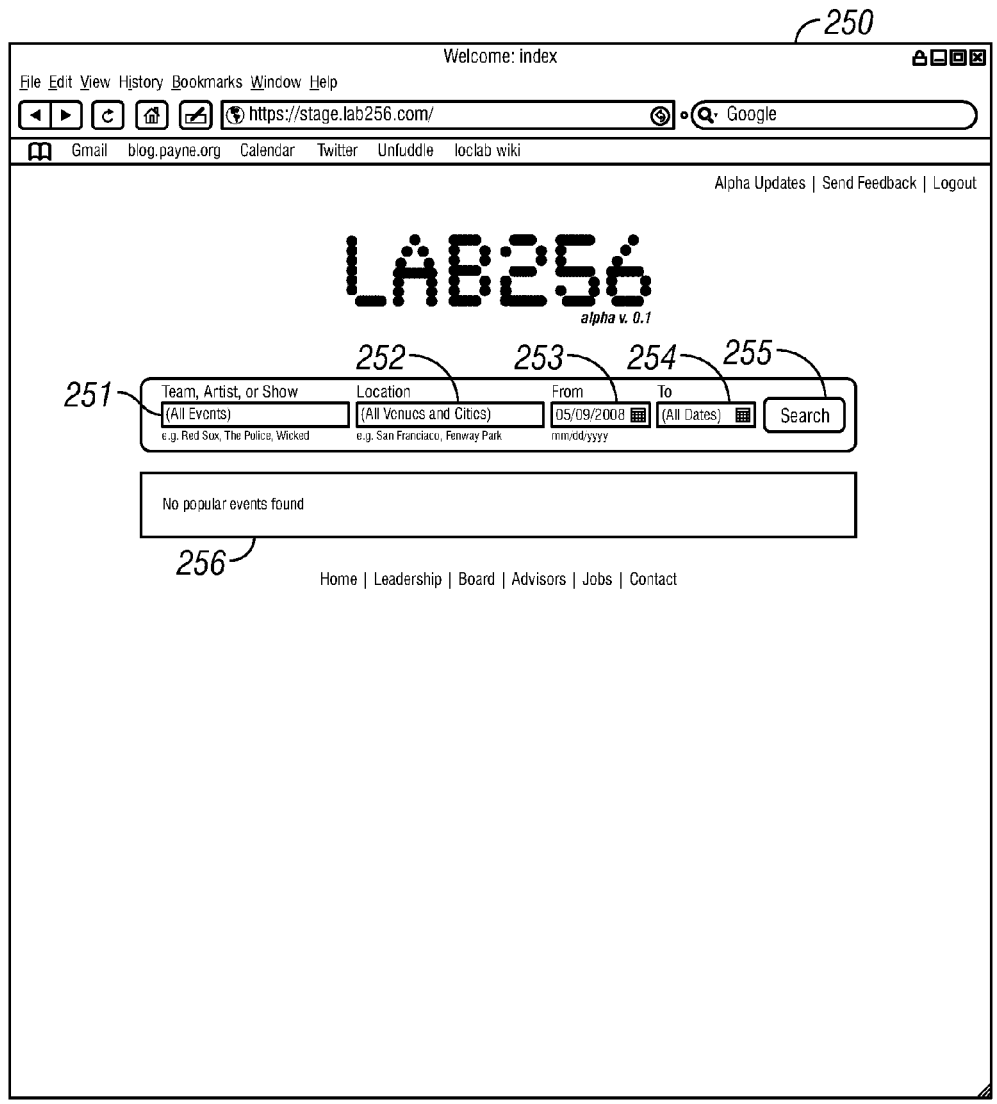
FIG. 2b is an alternative embodiment of the initial (starting) user interface page for the event search system.

FIG. 2*b* shows an alternative embodiment for the start page shown in FIG. 2*a*. In this embodiment, for Web page 250, the user enters search criteria for the desired event tickets in input box 251. The criteria may include an event name, artist name, or team name, or any portion thereof, in box 251 (e.g. "Boston Red Sox" or "Kenny Chesney"). If nothing is entered in box 251, the system will assume the user wishes to see all events.

The search criteria may include a location entered by the user in box 252, which may be a venue name (e.g. "Fenway"), a city name (e.g. "Boston"), a state (e.g. "West Virginia" or "WV") or any other name or description of a location. If nothing is entered in box 252, the system will assume the user wishes to see events for all locations.

The search criteria may include a "From:" date in box 253. If entered, the system will assume the user wishes to see events that occur on or after the date specified. If no date is entered in box 253, the system will assume the user wishes to see events starting from today's date.

The search criteria may include a "To:" date box 254. If entered the system will assume the user wishes to see events that occur on or before the date specified in box 254. If no date is entered in box 254, the system will assume the user does not wish to filter events occurring before a particular date.

In one embodiment, date boxes 253 and 254 may include month calendar dialog box popup that aids the user in choosing a date. This calendar dialog box popup does not permit selection of dates in the past. In addition, date box 254 may not permit selection of dates that occur before the date specified in box 253.

In another embodiment, the system may only present a subset of boxes 251, 252, 253, and 254 on page 250. For example, the system could only show box 251 and 252 and not allow users to search events by a date range with boxes 253 and 254.

In a variation of this embodiment, the system would only show additional boxes when the user selects an "advanced search" option (e.g. a button or link). When selected, this option would cause additional boxes to appear on page 250. For example, the system may initially present box 251 with an "advanced search" option. When this option is selected, boxes 252, 253 and 254 are shown.

Once the search criteria have been entered, the user presses search button 255 to initiate a search for events that match the criteria. Alternatively, the user may use the enter key. The user's criteria are transmitted from user browser 120 to server 110.

Description of Search Processing Steps

Figure 3:
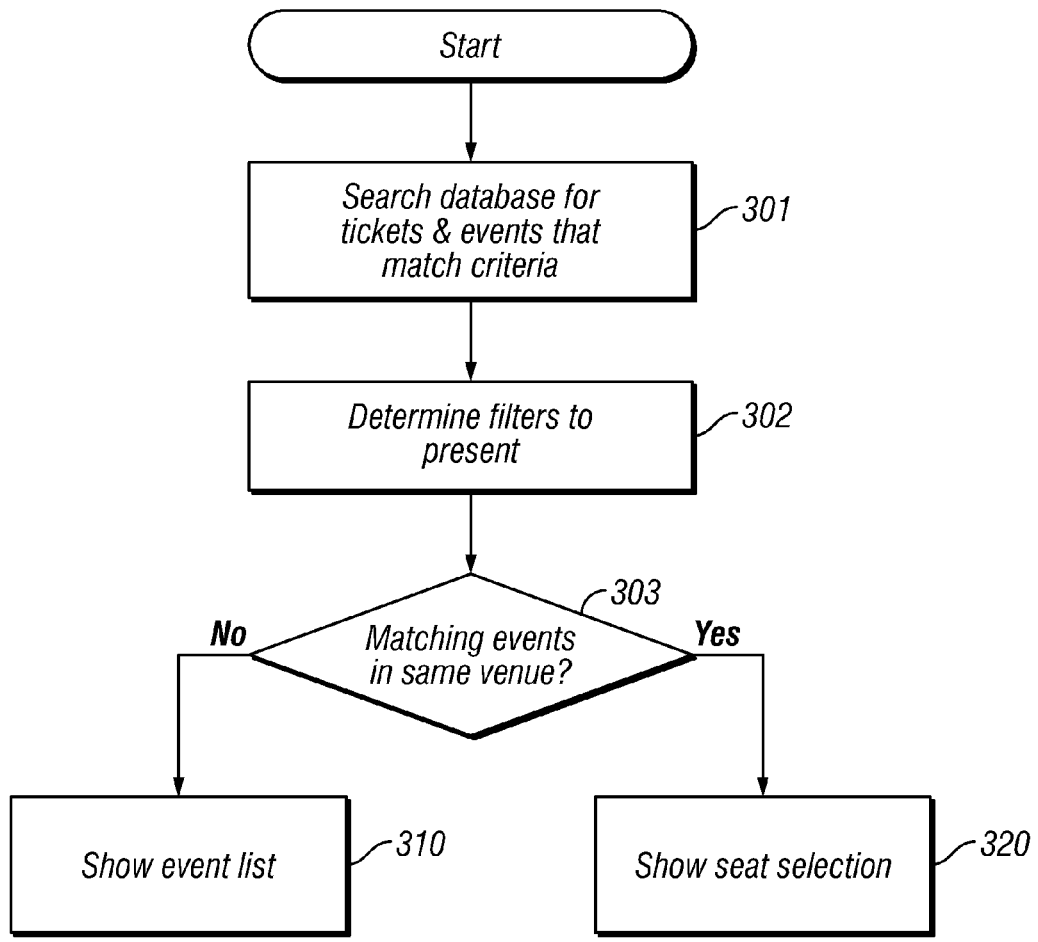
FIG. 3 is a description of the processing steps performed by the system in response to the user's search criteria.

FIG. 3 shows the processing steps that are performed when the user initiates a search by selecting button 202 on page 200 (or, in the alternative embodiment, button 255 on page 250). Processing begins at step 301, where search server 110 receives the user's search criteria.

For step 301, search server 110 searches database 111 for all events with tickets that match the user's specified criteria. Specifically, all events on the resulting event list have at least one ticket available that meets all of the user's specified criteria. Only events occurring in the future are selected; events that have already occurred are omitted.

In an alternative embodiment, events that have occurred in the past are included in the search. In this embodiment, the system may offer an option to the user (e.g. a checkbox) on page 200 or page 250 to indicate she wants to include past events in the search results.

In an alternative embodiment, events that have no tickets available that match the user's search criteria may be included in the search results.

For search criteria entered in box 201 on page 200, the system uses methods known to those skilled in the art to parse user's entry (e.g. "Kenny Chesney Charleston, W. Va."), extract the relevant elements (e.g. the specified artist "Kenny Chesney", and the location "Charleston, W. Va."), and then to find events that have tickets available that match the criteria.

For search criteria entered in the alternative embodiment start page 250, criteria elements that are not specified are not used to filter the search results. For example, if the user only specified "Boston Red Sox" in box 251, the system would select all Red Sox events without regard to filtering by location (e.g. box 252), from date (e.g. box 253) or to date (e.g. box 254). Similarly, if the user only specified "Fenway" in location box 252, the system would select all events located at Fenway Park, which could include events in addition to Red Sox games. Also, if the user entered no search criteria at all, the system would select all events with available tickets.

For step 302, the system considers the event list generated from step 302 to determine which filters (e.g. items 410, 411, 412, 413, 414 and 415 in FIG. 4) should be displayed on the event selection page 400. The filters displayed may depend on the user's search criteria, and/or characteristics of the event list and the tickets available for those events. In one embodiment, some filters may be always displayed. For example, price range filter 410 in FIG. 4 may be always displayed.

In another embodiment, filters may be omitted that do not offer more than one selection option based on the event list. For example, location filter 413 on FIG. 4 may be omitted if all of the events in the result list are in the same location (e.g. Fenway Park). Or, for example, day of week filter 412 may be omitted if all of the events on the results list occur on the same weekday (e.g. Sunday).

In another embodiment, filters may be omitted or presented based on the genre or type of the event the user searched for. For example, if the user searches for "Boston Red Sox", the system may determine that the event type is "baseball", and furthermore, for baseball events, the system will always show the user a "afternoon game" or "evening game" option for the user to filter search results.

In step 303, the system determines if all events in the result list occur at the same venue. If they do not, the system advances to step 310 to display an event list to the user. If the events in the result list are all at the same venue, the system advances to step 320 (e.g. skipping the display of the event list) to allow the user to select seats using a venue map (e.g. page 600 in FIG. 6). In one embodiment, the system may advance to step 320 only if: (a) all matching events are in the same venue, and (b) the number of events in the result list is below some pre-configured system threshold (e.g. 10). In another embodiment, the system may always advance to step 310 to display an event list, even if all of the matching events are in the same venue.

In step 310, search server 110 sends the event list back to browser 120 for display to the user (e.g. page 400 in FIG. 4). In one embodiment, this event list is returned as a Web page, and subsequent user actions on the page (e.g. manipulating filter settings) cause additional requests to be transmitted from user's browser 120 to search server 110.

In another embodiment, search server 110 returns a Web page that includes executable code that can execute in user's browser 120 (e.g. JavaScript, Adobe Flash, Microsoft SilverLight, etc.) along with the complete event list or a partial event list (or a summary of relevant fields). In this embodiment, user manipulations on the event result page may be handled locally within the user's browser 120, without requiring additional requests to be transmitted to search server 110. This method has the advantage of providing the user a faster response time to user requests, since the requests can be processed without having to go back to search server 110.

In step 320, search server 110 advances the user directly to the seat selection page 600 in FIG. 6.

Description of Event Selection Page

In FIG. 4, Web page 400 displays the event search results 420 that match the criteria specified by the user, for events that have tickets available to purchase. Search results list 420 includes detailed information about each event, including: team or artist or performer name(s), location, venue, date and time of the event, the number of tickets available, and the price information about those tickets.

In one embodiment, the search results list 420 is ordered by increasing distance from the location specified in the user's search criteria. For example, if the user searched for "the police Boston", result list 420 would show matching events with tickets in venues ordered in increasing distance from Boston, Mass. If a location was not specified by the user in the search criteria, the system may use the user's current physical location (or estimate of her physical location), determined by any number of methods known to those skilled in the art (e.g.

IP address geo-location, or explicitly specified by the user at some point in the interaction, or remembered from some previous interaction) to distance-order list 420. For example, if a user searched for "the police" from an IP address believed to be in the San Francisco area, result list 420 would show matching events with tickets in venues ordered in increasing distance from San Francisco, Calif.

In another embodiment, search results list 420 is ordered chronologically, with earliest events at the top.

Search information previously entered in box 201 on page 200 is carried through and presented on this page 400 in boxes 401. This permits the user to adjust their original search criteria and initiate a new search by selecting button 405, without having to first navigate back to page 200.

Web page 400 also includes filter controls (e.g. 410, 411, 412, 413, 414 and 415) that the user can manipulate to further refine result list 420. When the filters are manipulated, result list 420 is updated to show only events that match the user's filter selections. The filters shown in example page 400 are for illustrative purposes only; the actual filters presented may be determined dynamically based on the user's search criteria and the resulting list of matching events (e.g. see step 302 in FIG. 3).

Price range filter 410 is used to define the minimum and maximum price range the user is willing to pay for tickets. The user may click and drag the minimum and/or maximum price points on the filter to define the price range (or, alternatively, enter prices directly in the minimum and maximum boxes), and the system will update list 420 to only show events with tickets in that defined price range. For example, the user may drag the maximum price slider on filter 410 to "$250" and the system will only show events in list 420 that have tickets priced at $250 or less.

In an alternative embodiment, price range filter 410 includes an associated histogram showing the number of tickets available across events at each range of prices. For example, histogram 609 for price range filter 603 shown on FIG. 6 (and described in detail below) could be also present on price range filter 410.

In one embodiment, the prices used for filtering include the offered price for the tickets and any additional and calculable fees, charges or expenses charged by the selling provider. For example, if a Red Sox ticket for a particular game were offered at $300, but the selling provider charged a 10% handling fee, the system would consider the price of that ticket to be net price to the user: $300+10% ($30) or $330. In another embodiment, the ticket prices used for filtering based on the user's criteria are the simply the offered prices of the tickets (e.g. Red Sox tickets offered for sale at $300/each).

Number of tickets filter 411 is used to specify the number of tickets the user wishes to purchase (typically as adjacent seats). For example, a user may select "8" and the system will update list 420 to only show events that have events with tickets available for adjacent blocks of 8 seats.

Day of week filter 412 is used to select the day of the week the user wishes to attend the event on. For example, if the user checks "Saturday" and "Sunday", the system will update list 420 to show only events occurring on Saturday and Sunday. The "any" option is a convenience function for the user to easily select all days of the week.

Location filter 413 is used to choose the location or venue where the user wishes to see events for. For example, if the user checks "Boston, Mass." and un-checks all other options, the system would update list 420 to only show events located in Boston, Mass. The "any" option is a convenience function for the user to easily select all locations available.

Date range filter 414 is used to limit the date range for events. For example, if the user enters the date "Aug. 26, 2008" in the START box in filter 414, the system would update list 420 to only show events that occur on or after Aug. 26, 2008. Similarly, if the user entered "Oct. 25, 2008" in the END box in filter 414, the system would only show events in list 420 that occur on or before that date. If a user enters a date in both the START and END box, the system only shows events in list 420 that occur on or after the specified start date and on or before the specified end date.

Category filter 415 is used to choose the event type (e.g. "MLB", "NFL", "Broadway", "NCAA", "NASCAR", etc.). For example, if the user checks the "MLB" option in category filter 415, the system would update result list 420 to show events that were MLB events. The system would only present event type options in filter 415 for event types that were actually included in result list 420. For example, if list 420 included both MLB and NASCAR events, the system would display those two options in filter 415.

In another embodiment, additional filters may be presented on Web page 400, in addition to filters 410, 411, 412, 413, 414 and 415. Any attribute or information about a ticket may be used as a filter. For example, page 400 may present a filter for "event start time", offering a selection of options (e.g. "7 pm") for the start time for events in result list 420.

In another embodiment, the system may include a filter on Web page 400 for filtering events based on the distance from the user's location. This filter may be presented as a set of distance options (e.g. checkboxes), a text box to enter a maximum distance, or a slider (in a manner similar to the maximum price setting in price range filter 410). With this filter, events occurring at venues beyond a user-specified threshold would be omitted from the search result list 420. For example, if the user selected "50 miles", the system would omit events more than 50 miles away from the user's location.

In another embodiment, the system may disable certain options in filters 410, 411, 412, 413, 414, and 415 (or any other additional filters) if the filter option does not exist in any event in result list 420. Additionally, if all options are disabled, the system may omit the filter entirely. For example, category filter 415 in the example shown in FIG. 4 only has one option: "MLB". In the embodiment described here, filter 415 would be omitted entirely, because selecting the "MLB" option to filter the search results has no effect—all of the events in result list 420 are MLB category events.

In one embodiment, user manipulations of filters 410, 411, 412, 413, 414 and/or 415 (or any other filters on the page) are transmitted by the user's browser 120 to search server 110. Search server 110 selects events from database 111 that have tickets available that match all of the user's original search criteria and specified filter criteria. For example, if the user originally searched for "Boston Red Sox" and then selected only Sunday games using filter 412, the system would display only Boston Red Sox events that occur on Sundays. Search server 110 returns a new event list to user browser 120 for display to the user.

In another embodiment, search server 110 returns a Web page that includes client-side executable code that can execute in user's browser 120 (e.g. JavaScript, Adobe Flash, Microsoft SilverLight, etc.) along with the complete event result list a partial event result list (or a summary of relevant fields in either list) in response to the user's original request. In this embodiment, user manipulations on the event result page are handled locally within the user's browser 120, without requiring additional requests to be transmitted to search server 110. For example, a user may search for "Boston Red Sox", and be presented with a set of results on page 400. If the user then manipulates day of week filter 412 to show only Sunday games, the client-side executable code can apply the same filtering methods previously described to the event list, updating the list 420 with new results without interacting with search sever 100. This method has the advantage of providing the user a faster response time.

Once the user has chosen an event (or events) of interest, event result list 420 includes options to view seat availability and select seats using links 421 and 422. The user may choose to view seats for a single event (e.g. link 421), or may want to view seat availability for multiple events that occur in the same venue (e.g. link 422, which shows a 3-game baseball series).

Description of Processing Steps

Figure 5:
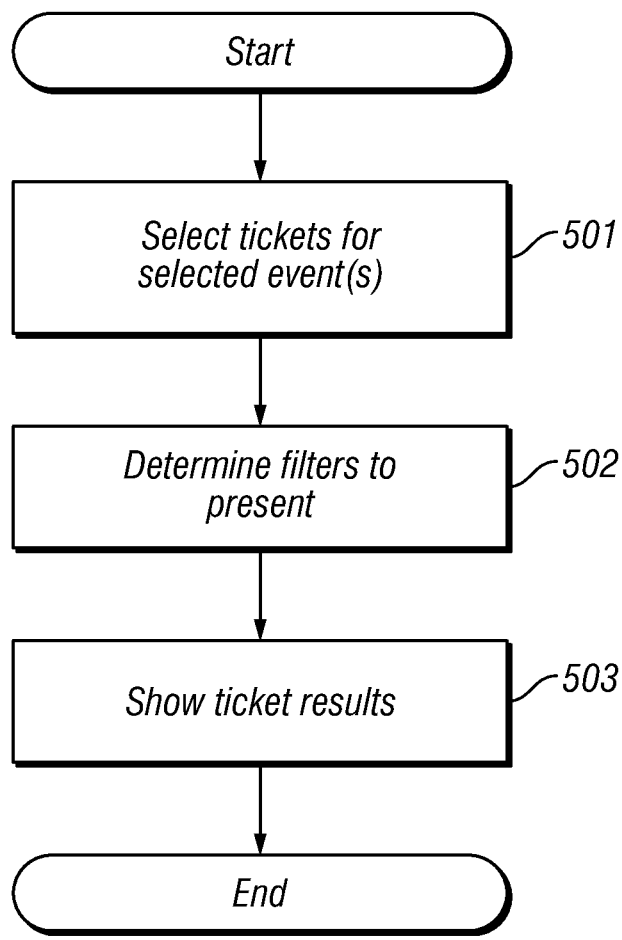
FIG. 5 is a description of the processing steps performed by the system in response to the user selecting an event or events for the purposes of selecting seats.

FIG. 5 shows the processing steps that are performed for user requests to view the available tickets for a given event or set of events (for example, by the user selecting link 421 or link 422 on page 400). Processing begins at step 501, where search server 110 receives the user's request.

In step 501, search server 110 selects all available tickets from database 111 that match the event or events requested by the user.

For step 502, the system considers the ticket list from step 501 to determine which filters (e.g. items 602, 603 in FIG. 6) should be displayed on the seat selection page 600. The filters that are displayed may depend on the user's search criteria, and/or characteristics of the ticket list. In one embodiment, some filters may be always displayed. For example, price range filter 603 in FIG. 6 may be always displayed.

In another embodiment, filters may be omitted that do not offer more than one selection option based on the ticket list. For example, the area/sections filter 604 on FIG. 6 may be omitted if all of the tickets in the result list are in the same area or section of the venue.

In step 503, search server 110 sends the ticket result list back to the user's browser 120 for display (e.g. page 600 in FIG. 6). In one embodiment, this ticket list page is returned as a Web page, and subsequent user actions on the page (e.g. changing of filter settings) cause additional requests to be transmitted from user's browser 120 to search server 110.

In another embodiment, search server 110 returns a Web page that includes executable code that can execute in user's browser 120 (e.g. JavaScript, Adobe Flash, Microsoft SilverLight, etc.) along with the complete ticket result list, a partial ticket result list (or a summary of relevant fields in either list). In this embodiment, user manipulations on page 600 may be handled locally within the user's browser 120, without requiring additional requests to be transmitted to search server 110. This method has the advantage of providing the user a faster response time to user requests, since the requests can be processed entirely within the user's browser 120 instead of having to go back to search server 110.

Description of Seat Selection Page

Web page 600 in FIG. 6 shows available tickets for the event or events selected by the user on page 400. For example, the user would be shown page 600 after selecting link 421 or 422 on page 400.

Web page 600 includes a venue map 610, with a visual display of areas with available tickets that match the user's criteria. The map provides information about available tickets located in different areas of a venue, including a detail hover box 611 presented when the user clicks on a section (or, in an alternative embodiment, mouses-over a section). The detail hover box 611 presents additional information about the indicated tickets, including: the name of the section, a description or other information about the section, the number of seats available, the number of seats available that match the user's criteria, the price range of the seats available in that section (e.g. the minimum and maximum price). Box 611 may also include an option for the user (e.g. by double-clicking with the mouse) to zoom venue map 610 into the section.

Box 611 may also include listings for multiple sets of tickets. For example, if different tickets are available from different providers in the same row & section, the system may display the information for all of the tickets for that row in a single detail hover box. Similarly, if the same tickets were available for purchase in different ways (e.g. through StubHub, and directly from Ace Ticket) the system would display the different purchase options in a single detail hover box (e.g. 611).

Available tickets that match the user's criteria are shown on venue map 610 with icons placed in the location (or approximate location) where the seats are located (for example, icon 612). Tickets displayed may be for a single event (e.g. a particular Red Sox vs Yankees game), or for multiple events (e.g. a three-game series of Red Sox vs Yankees at Fenway Park in Boston).

In another embodiment, available tickets are shown by coloring the entire section with a distinct color, outlining the section in a distinct manner, or highlighting with any method that distinguishes the section from sections where no tickets are available.

In another embodiment, venue map 610 is a top-down photograph (e.g. aerial or satellite image) of the venue.

Web page 600 also includes a list 620 of tickets that match the user's criteria. Control 621 provides the user an option to order the list by different criteria, such as: price ranked low to high, price high to low, name of seller, section in venue, etc. Each item (e.g. example item 622) shows detailed information about tickets available, including, price, location (e.g. section, row, etc.), the name of the seller, and any other information/notes about the ticket. If list 620 is showing tickets from multiple events (e.g. a series of baseball games occurring in the same venue), the list may also include event information (e.g. date and start time). Each item in list 620 includes a link 623 the user may select to purchase the tickets.

When the user mouse hovers over an item in list 620, the system displays a hover detail box (similar to box 611) over venue map 610 with an arrow or other indicator pointing to the location of the associated tickets on venue map 610. For example, if the user mouses over a set of tickets in list 620 in section "Bleacher 36", the system would display a hover box with an arrow to Bleacher section 36 in map 610.

In an alternative embodiment, the system may display different combinations of list 620 and venue map 610 on page 600. For example, the system may display only map 610 and omit list 620. Alternatively, the system may display only list 620 and map 620. This may occur, for example, in a case where a map for the associated venue is not available. In addition, the system may provide controls for the user to display or hide list 620 and map 620 on page 600.

Page 600 also includes filters (e.g. 602, 603, 604, and 605) that the user can manipulate to further refine the search criteria. When the filters are manipulated, list 620 is updated to only show tickets that match the filter criteria and venue map 610 is updated to only indicate sections with matching tickets.

Event filter 601 is used to specify which event (in a series of events) the user wishes to see tickets for. For example, when considering tickets for a three-game baseball series, the user may wish to see tickets for all three games, or only tickets for game #2. In an alternative embodiment, filter 601 is implemented as a checkbox control, allowing the user to filter any combination of events for a series (e.g. choose to see tickets for both game #1 and #3 in a three-game series, omitting tickets for #2).

Seat number filter 602 is used to specify the number of tickets (e.g. adjacent seats) the user wishes to purchase. For example, a user may select "8" and the system will update venue map 610 and list 620 to only show options with tickets available for purchase in adjacent blocks of 8 seats.

Price range filter 603 is used to define the minimum and maximum price range the user is willing to pay (for each ticket). The user may click and drag the minimum and/or maximum price points on the filter to define the price range, and the system will update list 620 and venue map 610 to only show options with tickets in that price range. For example, the user may drag the maximum price slider on filter 603 to "$250" and the system will only show tickets in list 620 and will only highlight sections in venue map 610 that have tickets costing $250 or less.

The system presents a histogram 609 along the same axis as the price range filter 603. The vertical height of the histogram bars represents the number of tickets available at each range of prices, giving the user a convenient way to see the number of ticket options available at different price ranges.

Also, the colors used to show seat availability (e.g. icon 612) correspond to the colors of the bars in histogram 609. For example, the yellow color used in icon 612 is the same as the yellow used in the first (left-most) bar in histogram 609, indicating that the price of the tickets in the section represented by icon 612 fall into the price range indicated by that first histogram bar. This allows the user to quickly see (by color) the relative price & location of tickets.

The system may use a continuum or spectrum or gradient of colors for the bars for histogram 609 (and corresponding icons, such as icon 612) so the user may visually compare relative prices of tickets. For the example in FIG. 6, the colors range gradually from yellow to brown (left to right, in this example), so a user looking at the icons on the venue map 610 can quickly determine that "yellowish" icon colors correspond to lower-priced tickets, and "brownish" colors correspond to higher-priced tickets.

Figure 6A:
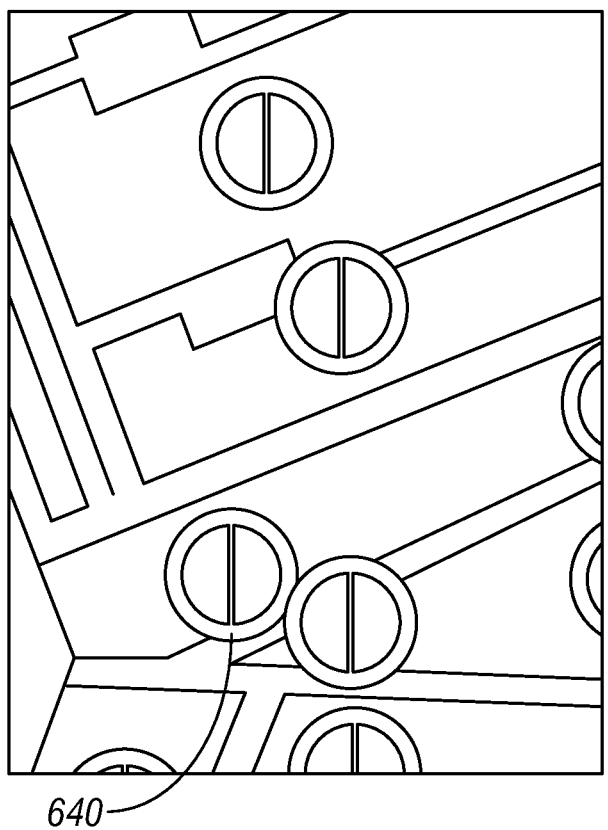
FIG. 6a is a section of FIG. 6 shown in higher resolution detail.

When the price ranges for tickets available in a given section span more than one histogram bucket, the system may present a "split" icon 640 as shown in FIG. 6a. (FIG. 6a shows an area of FIG. 6 with increased resolution and detail). In this icon presentation, the color on the left side if the icon corresponds to the histogram bucket price range for the lowest-priced tickets in that section, and the color on the right side corresponds to the histogram bucket price range for the highest-priced tickets in that section.

The system may determine the distribution of tickets and prices in histogram 609 using several methods. In one embodiment, the price range of available tickets is evenly allocated among a fixed number of histogram bars (also called "buckets"). For example, if the most expensive available ticket is $2,000 and there are 8 histogram buckets, the system would allocate the first bucket to tickets priced $0 to $249, the second bucket to tickets priced $250 to $499, and so on. This method has the advantage of being easy implementation, but in cases with a small number of highly priced tickets, the histogram can get compressed to the left side. For example, consider the case where available tickets range in price from $5 to $500, with a single ticket available for $10,000.

In another embodiment of histogram 609, the system uses an upper threshold price for the lowest bucket, and a (different) lower threshold price for the uppermost bucket, so that a specific percentage of tickets is placed in each of the lowest and uppermost histogram buckets. The price range of the remaining tickets is then evenly allocated between the remaining buckets (Le. the buckets between the lower and upper). For example, consider a case with 8 histogram buckets, and 12.5% of tickets in the lowest bucket (#1) and 12.5% in the uppermost bucket (#8). The system selects an upper price threshold (say, by way of example, $150) for the lower bucket such that 12.5% of available tickets were placed in that bucket. In other words, 12.5% of available tickets are priced less than $150. Similarly, the system selects a lower price threshold (say, by way of example, $1,350) for the uppermost bucket. In other words, 12.5% of available tickets are priced at more than $1,350. The system then evenly price allocates the remaining tickets (75% of the tickets, in this example) in the remaining 6 buckets (#2 through #7). In this example, bucket #2 represents tickets priced $150 to $349, bucket #3 represents $350 to $549, etc.

In an alternative embodiment, the system uses only a single threshold price for the upper or lower bucket. For example, the system may use a threshold price for only the upper bucket (e.g. omitting the lower bucket), and then evenly allocate the remaining tickets from zero to the upper bucket price threshold.

Area/section filter 604 is used to select seats in particular sections of the venue. For example, if the user selects the "EMC Club" option, only tickets that are in the EMC Club section of the venue would be displayed.

Provider (e.g. a ticket broker, any form of ticket seller, etc.) filter 605 is used to select seats sold by a particular selling ticket provider. For example, if the user selects "Ace Ticket", only tickets sold by Ace Ticket would be displayed.

Filters on page 600 that have corresponding filters on the event selection page 400 will have the filter criteria on page 400 carried through as the initial settings for filters on this page 600. For example, if the user specifies a maximum price of $500 using filter 410 on page 400, the initial maximum price setting for filter 603 will be set to $500.

In other embodiments, additional filters may be presented on page 600, in addition to filters 602, 603, 604 or 605. Any attribute or information about a ticket may be used as a filter.

In one embodiment, page 600 includes a filter for seat quality. For example, if seats are ranked by relative quality, where the best seats within a venue are given a rank of 5 (e.g. "5 stars") and the worst seats are given a rank of 1, page 600 may include a filter for seats based on this quality ranking. In this filter example, if the user selected "3 stars", the system would show all seats ranked 3 or better (e.g. seats ranked 3, 4 or 5). This filter could be used in conjunction with any method to determine relative seat quality (e.g. quality ranks determined by the operator of the system based on analysis of the venue layout, quality ranks provided by users, etc.)

In another embodiment, page 600 includes a filter for the method by which the ticket will be delivered to the user (e.g. electronic ticketing, physical mail, will call, etc.). For example, if the user selected "Will Call", the system would display only available tickets that were available for pickup at the venue.

In another embodiment, page 600 includes a filter for seats that have handicapped access.

In another embodiment, page 600 includes a filter for seats that are expected to be in the sun or shade during the event.

In another embodiment, page 600 includes a filter for seats that have an obstructed vs clear view of the playing field. For example, if the user unselected "Obstructed View", the system would display only available tickets that had a clear view of the playing field.

In another embodiment, page 600 includes a filter for seats that have food and drink included, or have special catering services.

In another embodiment, page 600 includes a filter for seats that are in a section of the venue that are "alcohol free".

Figure 6B:
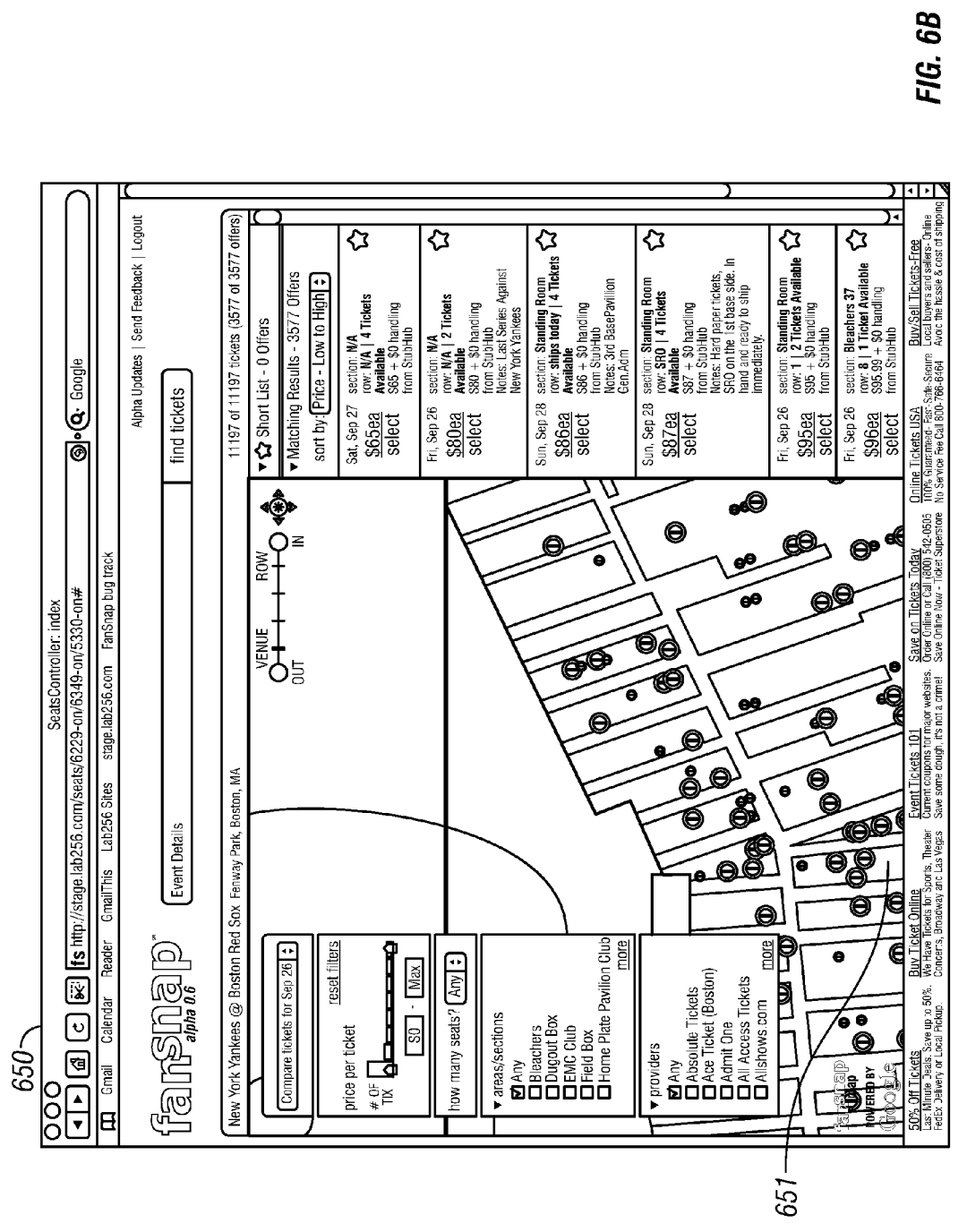

Venue map 610 includes zoom control 630 for zooming the map view in and out. FIG. 6b shows a Web page 650 with a zoomed in venue map 651, which is displayed as the result of the user manipulating zoom control 630 to "zoom in" and see additional detail. The user may pan the venue map (at any zoom level) by clicking and dragging.

At certain zoom thresholds, the system will present additional detail in venue map 651. As the user zooms in further, more detail and information is presented. For example, venue map 651 shows row-level information (e.g. row extents and row numbers) that may not be visible in a zoomed-out venue map (e.g. venue map 610).

In another embodiment, venue map 610 may include additional icons to indicate the location of key services to further aid the user in selecting seats. For example, map 610 may include icons that represent the location of restrooms, concessions or other services. In addition, page 600 may include controls (e.g. a checkbox) that allow the user to enable and disable the display of these information icons.

The system also provides a mechanism for users to select a candidate list (also referred to as a "short list") of tickets to purchase, to easily compare several options to make a final purchase decision. The short list of tickets selected by the user is shown in the area 635. Tickets may be added to the short list by selecting an icon on each listed ticket (e.g. icon 631, represented in this example with a star).

FIG. 6c shows a section of Web page 600, after the user has selected tickets to be added to the short list. Short list 660 displays tickets 661 that were added by the user. Where tickets in the short list are shown in the list of tickets (e.g. tickets 662), the selection icon 663 is highlighted to indicate to the user the tickets are on the user's short list.

Any tickets on the short list (e.g. list 660 or list 635) are preserved where the user changes the events to view on page 600. For example, if the user adds a ticket to short list 635, then manipulates control 601 to view only a tickets for only a single event instead of a series of events, short list 635 would still display the ticket (or tickets) previously added by the user.

Once the user has identified tickets to purchase, she selects link (or button) presented each ticket listing (e.g. link 623).

Description of Checkout Process

Figure 7:
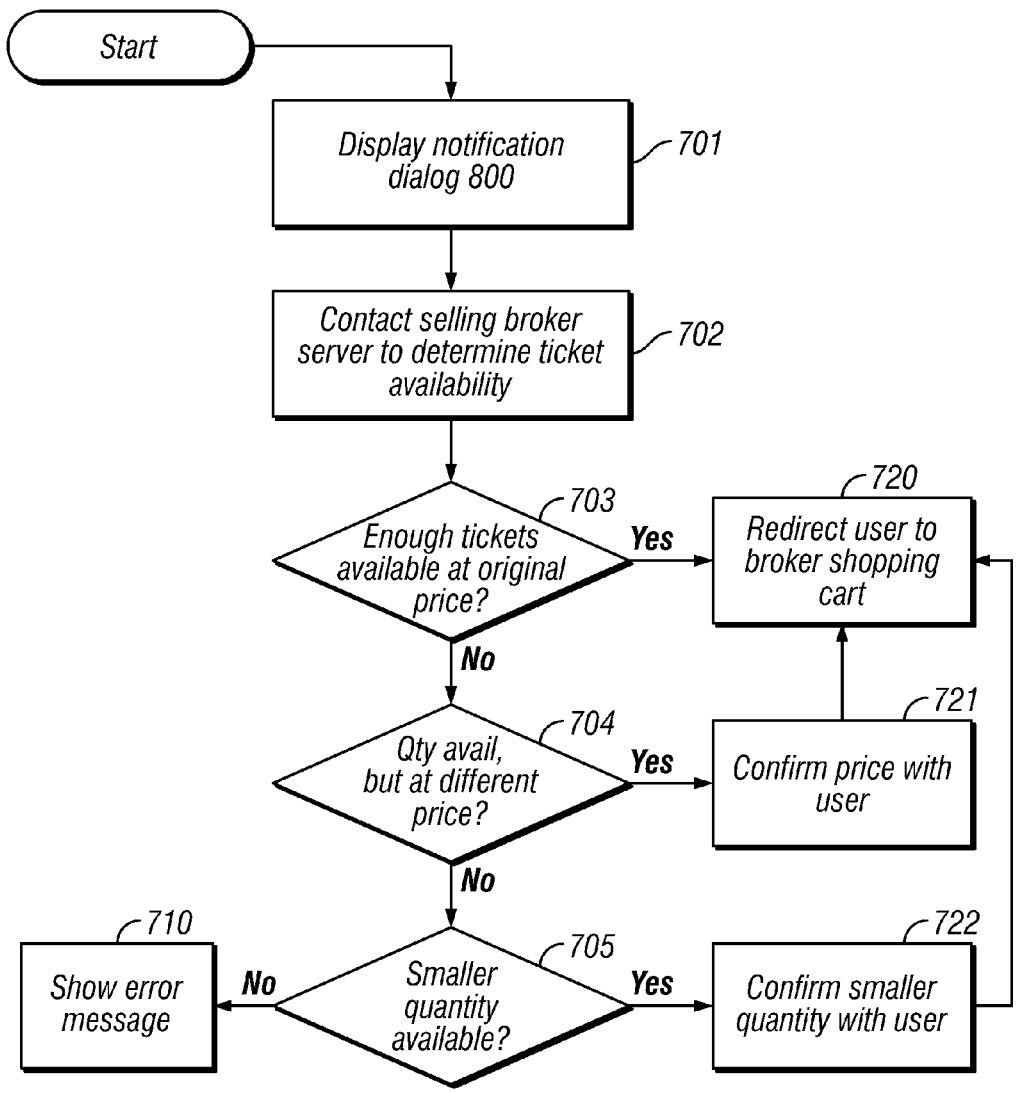
FIG. 7 is a description of the processing steps performed by the system in response to the user selecting tickets for purchase.

When the user selects tickets for purchase (e.g. by selecting a link, such as link 623), the system performs the checkout process shown in FIG. 7. Processing begins at step 701.

Figure 8:
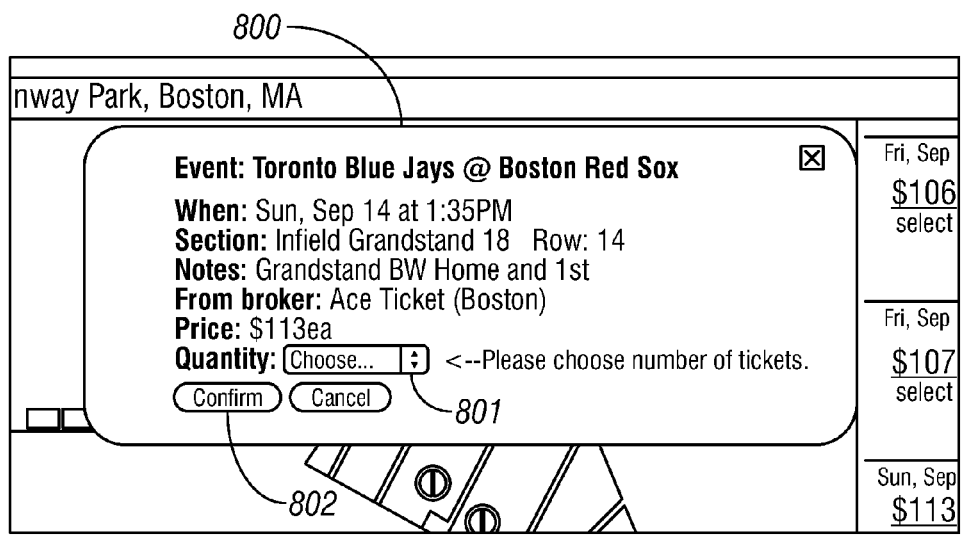
FIG. 8 is an example of the dialog box shown to the user when she selects tickets for purchase.

For step 701, the system displays dialog 800 (shown in FIG. 8) to confirm the user's ticket purchase. In this step the user selects the quantity of tickets she wishes to purchase (using control 801) and then selects "Confirm" button 802 to continue.

For step 702, the system contacts the provider inventory server 130 corresponding to the provider selling the tickets, to determine current price and availability for the desired tickets. The system needs to perform this check because the event & ticket database 111 may be out of synchronization with the actual availability of the user's desired tickets. For example, if the desired tickets were just purchased by another user, the inventory update information (reflecting that purchase) may not have been passed to database 111 in time to display during the user's search process.

Figure 9:
FIG. 9 is an example of a shopping cart or checkout page shown on the selling provider's Web site.

For step 703, based on the information returned in step 702, the system checks to see if the provider still has a sufficient quantity of tickets available at the price offered to the user during the search process. If so, processing proceeds to step 720 where the user's browser is redirected to the Web site for the selling ticket provider, corresponding to provider Web server 131. Information identifying the specific tickets the user is purchasing is passed in the URL directing to the ticket provider's Web site. The user browser then displays the selling ticket provider's checkout (or "shopping cart") page (for example, page 900 in FIG. 9). The user then finishes the purchase process on the ticket provider's Web site.

Note that page 900 is shown merely as an example of one such ticket provider Web page and checkout process. The Web page and purchase process will differ, depending on selling ticket provider.

If there are not enough tickets available at the offered price, processing advances to step 704. In this step, the system checks if there are enough tickets available for the user's requested quantity, but at a different price. If this is the case, processing advances to step 721 where the system presents a dialog box (or other interaction) that confirms the changed price with the user. After the user confirms the new price, processing advances to step 720 where the user's checkout is processed as previously described.

In another embodiment, step 704 only presents confirmation 721 if the current price is higher than the price originally offered. If the current price is lower than the offer price, the system may skip confirmation step 721 and go directly to the ticket provider's shopping cart in step 720.

If there isn't a sufficient quantity of tickets available, processing advances to step 705, where the system checks to see if there's any tickets available at all. If there is, processing advances to step 722 where the system presents a dialog box (or other interaction) that confirms a lower quantity of tickets. If the user confirms the lower quantity, processing advances to step 720 where the user's checkout is processed as previously described.

If no tickets are available, processing advances to step 710 and an error message is presented to the user.

In another embodiment, if the desired quantity is not available and the price has changed, the system may present a single dialog box confirming both a lower quantity and changed price, before advancing to the checkout step 720.

End Matter

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Expected variations or differences in the results are contemplated in accordance with the objects and practices of the present invention. It is intended, therefore, that the invention be defined by the scope of the claims which follow and that such claims be interpreted as broadly as is reasonable.

What is claimed is:

1. A method for executing instructions from an event ticket search system, comprising:
    providing an event ticket search system that includes, a network, using a user's Web browser to provide one or more search results of ticketed events to a user that submits a request with ticket search criteria to an event search;
    using one or more filters coupled to an event search server;
    providing filtering of search results in response to the ticket search criteria; and
    using filtered search results to purchase tickets, wherein the system is configured to provide a price range of available tickets displayed in a price availability graph with an upper threshold price for a lowest portion of the graph and a different lower threshold price for an uppermost portion of the graph; wherein a specific percentage of tickets is placed in each of the lowest and uppermost portions of the graph.

2. The method of claim 1, further comprising:
    using different filters for different functions.

3. The method of claim 1, further comprising:
    filtering search results with a combination of settings selected by the user.

4. The method of claim 1, further comprising:
    using one or more filters to filter at least one of, date range, price range of available tickets, number of seats available in a block, day of week, time of day, category of event, event type, artist, sport team, selling provider, location and distance from user's location.

5. The method of claim 4, further comprising:
    using a venue map to show available tickets that match the user's search criteria.

6. The method of claim 4, further comprising:
    using the venue map to provide information about available tickets located in different areas of an event venue.

7. The method of claim 1, further comprising:
    using the venue map to provide a hover box presented when the user mouses-over or clicks on a section of the event venue.

8. The method of claim 7, further comprising:
    using the hover box to present additional information about indicated tickets, the additional information selected from at least one of, a name of a section, a description of the section, a number of seats available, a number of seats available that match the user's search criteria, a price range of seats available in a section and name or identity of the ticket provider.

9. The method of claim 6, further comprising:
    using the hover box to zoom the venue map into a section.

10. The method of claim 4, further comprising:
    using the venue map to show available tickets that match the user's search criteria with icons placed in a location or approximate location where seats are located.

11. The method of claim 1, further comprising:
    using a venue map to show tickets from one or more events.

12. The method of claim 1, further comprising:
    using at least a filter on a map page with a seat map of a venue.

13. The method of claim 12, further comprising:
    using the filter on the map page for real-time updating of the display of matching available tickets.

14. The method of claim 12, further comprising:
operating the filter on the map page through user manipulation.

15. The method of claim 14, further comprising:
using a user interface control for user manipulation, wherein the user interface control is selected from at least one of, clicking and dragging a price slider, checkboxes, radio buttons, drop down lists and direct entry.

16. The method of claim 1, further comprising:
using a ticket provider inventory server that is coupled to the event search server.

17. The method of claim 1, further comprising:
using a computer system to enable the user to communicate with the event search server and other systems on the network to obtain event and ticket information.

18. The method of claim 17, further comprising:
using a network-capable device to enable the user to communicate with the event search server and other systems on the network to obtain event and ticket information, wherein the network-capable device is selected from at least one of, a personal digital assistant (PDA), a cellular telephone, a pager, a television set-top-box, MP3 player and a personal computer.

19. The method of claim 18, wherein the user's computer is a client of the search server.

20. The method of claim 1, further comprising:
providing communication pathways between the user, event search server, and a ticket provider inventory server.

21. The method of claim 1, further comprising:
using the database to obtain the tickets that are available for purchase and the events for which those tickets relate, wherein the database includes information selected from at least one of, price, row, section, number of tickets, descriptive notes, name of a selling ticket provider, venue name, city & state, the artist or team(s) performing, type of event, starting date and starting time.

22. The method of claim 1, further comprising:
presenting the price availability graph as a histogram.

23. The method of claim 22, further comprising:
presenting the histogram along a same axis as a price range filter.

24. The method of claim 23, further comprising:
using a vertical height of the histogram to represent a number of tickets available at each range of prices.

25. The method of claim 22, further comprising:
using colors to show seat availability on a venue map.

26. The method of claim 22, further comprising: using a continuum or spectrum or gradient of colors for the price availability graphs to provide the user with an ability to visually compare relative prices of tickets.

27. The method of claim 22, further comprising:
utilizing an icon presentation for different price ranges of tickets that can be arranged in price availability graph portions.

28. The method of claim 22, further comprising:
providing a price range of available tickets evenly allocated among a fixed number of price availability graph portions.

29. The method of claim 1, further comprising:
enabling the user to select a candidate list of tickets to purchase and compare different options to make a final purchase decision.

30. The method of claim 29, further comprising:
including additional tickets to the candidate list of tickets.

31. The method of claim 30, further comprising:
preserving tickets on the candidate list of tickets when the user changes events to view.

32. The method of claim 1, further comprising:
generating a checkout process in response to selection of one or more tickets for purchase by the user.

33. The method of claim 32, further comprising:
displaying dialog box to confirm the user's ticket purchase during the checkout process.

34. The method of claim 33, further comprising:
during the checkout process, selecting a quantity of tickets the user desires to purchase; and
confirming the quantity of tickets and continue the checkout.

35. The method of claim 34, further comprising:
prior to the checkout process being completed contacting a ticket provider inventory server, that corresponds to a ticket provider selling tickets, to generate current price and availability for the one or more tickets selected for purchase by the user.

36. The method of claim 35, further comprising:
in response to the generation of current price and availability, performing a check to determine if the ticket provider has a sufficient quantity of tickets available at the price offered to the user during the search process.

37. The method of claim 35, further comprising:
in response to determining that the ticket provider has the sufficient quantity of tickets available at the price offer, redirecting the user's browser to a Web site of the ticket provider.

38. The method of claim 37, further comprising:
passing information identifying specific tickets the user is purchasing in the URL and directing to the ticket provider's Web site.

39. The method of claim 35, further comprising:
when the current price of a ticket is lower than a buyer's offer price using the user's browser to display the ticket provider's checkout page or shopping cart and the user finishes the purchase process on a broker's Web site.

40. The method of claim 38, further comprising:
after passing to the URL using the user's browser to display the ticket provider's checkout page or shopping cart.

41. The method of claim 40, further comprising:
after the user's browser displays the ticket provider's checkout page or shopping cart, finishing the purchase process on the ticket provider's Web site.

42. The method of claim 37, further comprising:
in the event that there are insufficient tickets at the user's offer price, determining if there are enough tickets available for the user's requested quantity at a different price.

43. The method of claim 42, further comprising:
in the event that the user's requested quantity is available at a different price then the system confirms the changed price with the user.

44. The method of claim 43, further comprising:
processing the user's checkout when the user confirms the new price.

45. The method of claim 36, further comprising:
in response to there being an insufficient quantity of available tickets, determining if there are any available tickets.

46. The method of claim 45, further comprising:
in response to there being available tickets, the system confirms a lower quantity of tickets.

47. The method of claim 46, further comprising:
processing the user's checkout in response to the user selecting the lower quantity of tickets.

48. The method of claim 36, further comprising:
when there are no available tickets, presenting an error message to the user.

49. The method of claim 36, further comprising:
when the desired quantity of tickets is not available and the price has changed, the system confirms both a lower quantity and changed price before advancing to checkout.

* * * * *